June 24, 1930.  H. P. MOHR  1,768,289
MACHINE FOR KILLING QUACK GRASS
Filed Sept. 25, 1928
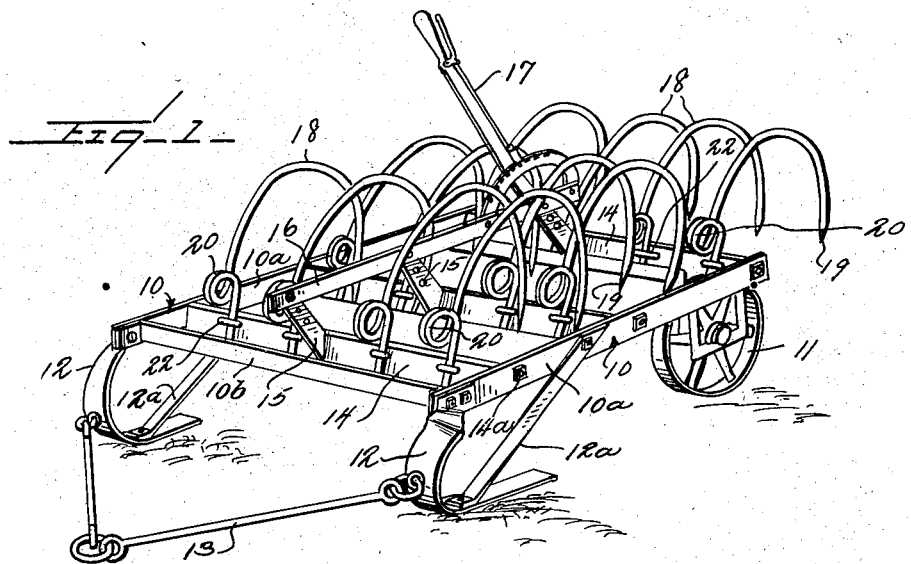
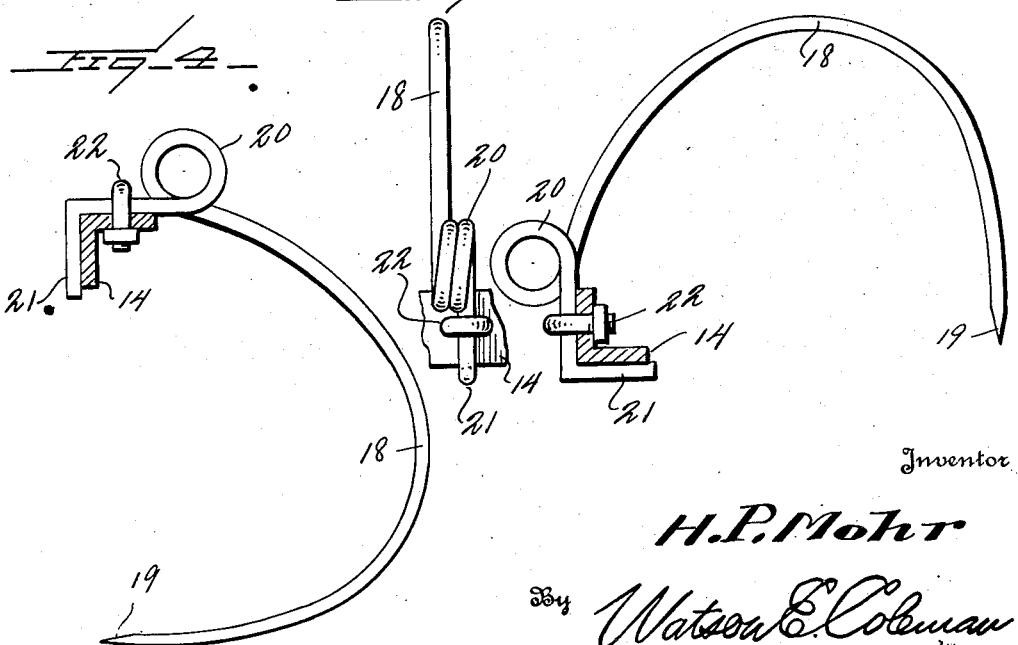
Inventor
H. P. Mohr
By Watson E. Coleman
Attorney Patented June 24, 1930

1,768,289

UNITED STATES PATENT OFFICE

HENRY P. MOHR, OF MORRIS, MINNESOTA

MACHINE FOR KILLING QUACK GRASS

Application filed September 25, 1928. Serial No. 308,182.

This invention relates to a machine for killing quack grass and more particularly to a machine for removing the roots of such grass from the ground.

As is well known to those familiar with quack grass, this weed is one of the most difficult, if not the most difficult, to eradicate since it propagates not only by seeds but by roots any joint of which will spring up in the form of an independent plant. Accordingly, an ordinary plowing of the ground with a tool which has any cutting edges upon it and a subsequent removal of the tops will result in a subdivision of the roots in such manner that the number of resulting plants is greatly increased and the growth of the root joint plants materially accelerated, due to the fact that the joint no longer has to supply food to the parent plant. The only practical method of eradication is to attack these plants before the seeds have developed and with an apparatus which will remove the roots without breaking the same into a number of sections and will actually tend to draw the roots from the ground which may be fairly readily accomplished, due to the fact that the roots are very tough. Accordingly, an important object of this invention is the production of an apparatus of this character.

A further and more specific object of the invention is the production of a subsoiling tooth in use in apparatus of this character which is so constructed that it will pass readily through the ground without clogging, which will engage the roots forcibly to withdraw the same and direct them to the surface without excessive breakage and which, at the same time, is yieldable so that it will not be destroyed by contact with roots, stones and the like.

These and other objects I attain by the construction shown in the accompanying drawings, wherein for the purpose of illustration is shown a preferred embodiment of my invention and wherein:—

Figure 1 is a perspective view of a machine for killing quack grass constructed in accordance with my invention;

Figure 2 is a detail view showing one of the teeth in side elevation and in an inoperative position;

Figure 3 is a front elevation of the tooth;

Figure 4 is a side elevation thereof with the tooth in working position.

Referring now more particularly to the drawings, the numeral 10 generally designates a rectangular frame having a pair of parallel side bars 10ª held in spaced relation by spacing members 10ᵇ which is preferably supported at its rear end by wheels 11 and at its forward end by skids 12 to which a draw bar mechanism 13 may be conveniently attached. A bracing member 12ª connects the skid to the side bars 10ª. Extending transversely of the frame are a plurality of pivoted oscillatable bars 14 preferably of angle iron and having their ends rotatably connected at 14ª to the frame bars 10ª. These bars are connected through arms 15 and a tie rod 16 to a lever 17 coacting with the quadrant whereby they may be held in desired oscillatably adjusted positions. Secured to each bar are a plurality of spring cultivator teeth 18, each circular in cross section and semi-circular in shape. At one end, the tooth is pointed, as indicated at 19, and near its opposite end is formed with a double coil 20, while said opposite end is angularly bent, as indicated at 21, to fit about the angle iron bar to which it is secured, as at 22. These teeth, when in working position, have the pointed ends 19 thereof horizontally disposed and directed in the direction of movement of the frame, so that they will slide readily beneath the roots and lift upon the same. The material employed in the construction of the teeth is preferably of spring steel of about nine-sixteenths of an inch in diameter, so that a broad supporting surface is provided for these roots which will not tend to break the same but will draw them upwardly through the ground to the upper surface where they may be readily reached for collection in piles, so that they may be destroyed by the sun.

While I have above described the use of the apparatus in the function for which it is intended, it will, of course, be obvious that it can be used in ordinary cultivating capacities in the same manner that any spring tooth harrow can be employed.

It is likewise obvious that the structure hereinbefore set forth is capable of a certain range of change and modification without materially departing from the spirit of the invention, and I accordingly do not limit myself to such specific structure except as hereinafter claimed.

I claim:—

In a machine for killing quack grass, a frame structure having a pair of spaced parallel bars, means for maintaining the bars in spaced relation to each other, a plurality of pivotally mounted transverse bars mounted between said parallel bars, a plurality of semi-circular cultivator teeth mounted on said pivoted bars, operating means mounted on the frame for turning the pivoted bars on their pivots, skid means mounted on the forward end of said parallel bars, bracing means mounted at one end on the parallel bars and at the opposite end secured to said skid means for holding the same in rigid position, and a pair of wheels mounted adjacent the rear end of said parallel bars for holding the frame in substantially horizontal position.

In testimony whereof I hereunto affix my signature.

HENRY P. MOHR.